US006378806B1

(12) United States Patent
Erben

(10) Patent No.: US 6,378,806 B1
(45) Date of Patent: Apr. 30, 2002

(54) AIRCRAFT DOOR STRUCTURE

(75) Inventor: Hannes Erben, Donauwoerth (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/574,617

(22) Filed: May 19, 2000

(30) Foreign Application Priority Data

May 21, 1999 (DE) .......................................... 199 23 441

(51) Int. Cl.[7] .................................................. B64C 1/14
(52) U.S. Cl. ............................... 244/129.5; 244/129.4; 244/131
(58) Field of Search ........................... 244/129.5, 129.1, 244/129.4, 121, 131; 49/386, 387, 400, 247, 248, 249; 114/116, 117, 201 R; 220/324

(56) References Cited

U.S. PATENT DOCUMENTS 4,199,120 A * 4/1980 Bergman et al. .......... 244/129.5
4,720,065 A 1/1988 Hamatami et al.

FOREIGN PATENT DOCUMENTS

DE      2907550    9/1980
DE    19730918    1/1999

* cited by examiner

Primary Examiner—Charles T. Jordan
Assistant Examiner—Timothy D Collins
(74) Attorney, Agent, or Firm—W. F. Fasse; W. G. Fasse

(57) ABSTRACT

A door for an enclosed space under pressure, such as an aircraft cabin, has redundant door stops secured to the door edges and cooperating with redundant frame stops secured to a door frame in an aircraft body. The door stops and the frame stops are arranged in pairs. A first pair of stops is effective under normal operating conditions to keep the door in a sealed position in the door frame. A second pair which is not transmitting any loads under normal operating conditions, becomes effective immediately when one and/or both stop components of the first pair fails. For this purpose the stop member and stop element forming the second pair are normally spaced from each other by a gap that is small enough to close instantly in response to failure of the first pair of stops.

12 Claims, 4 Drawing Sheets

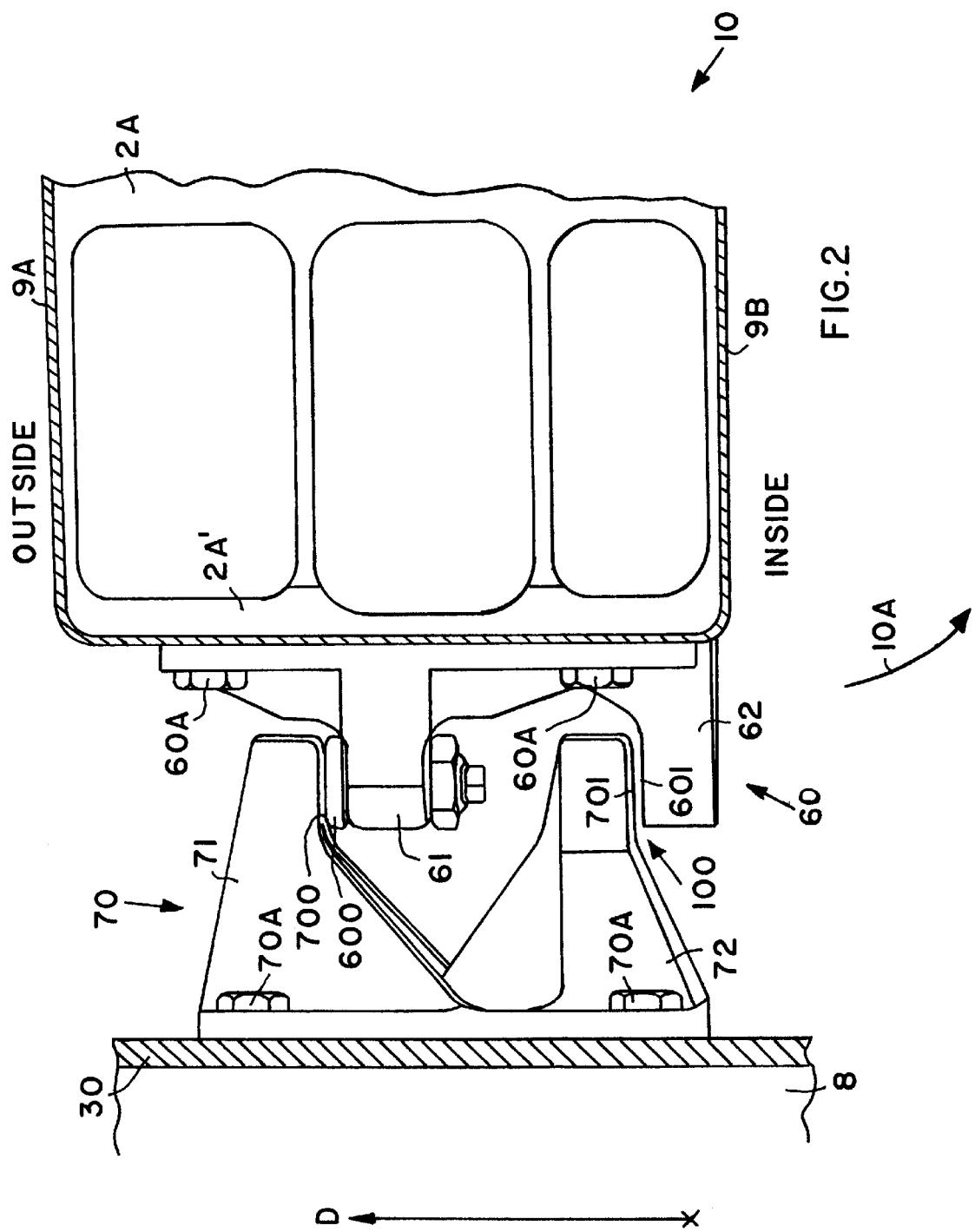

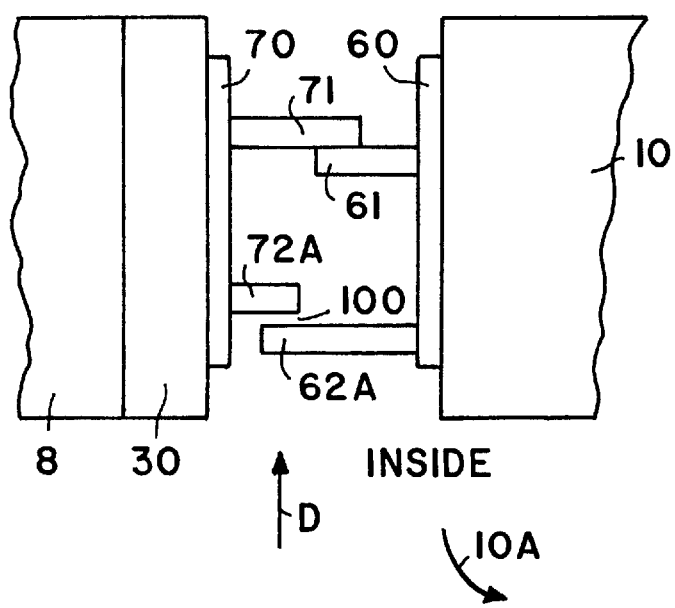
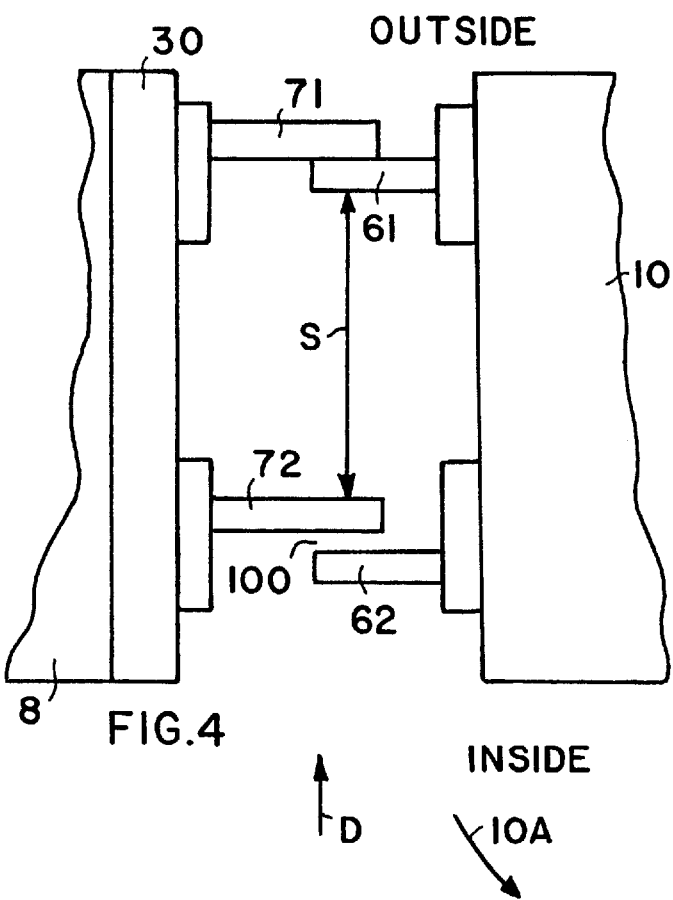

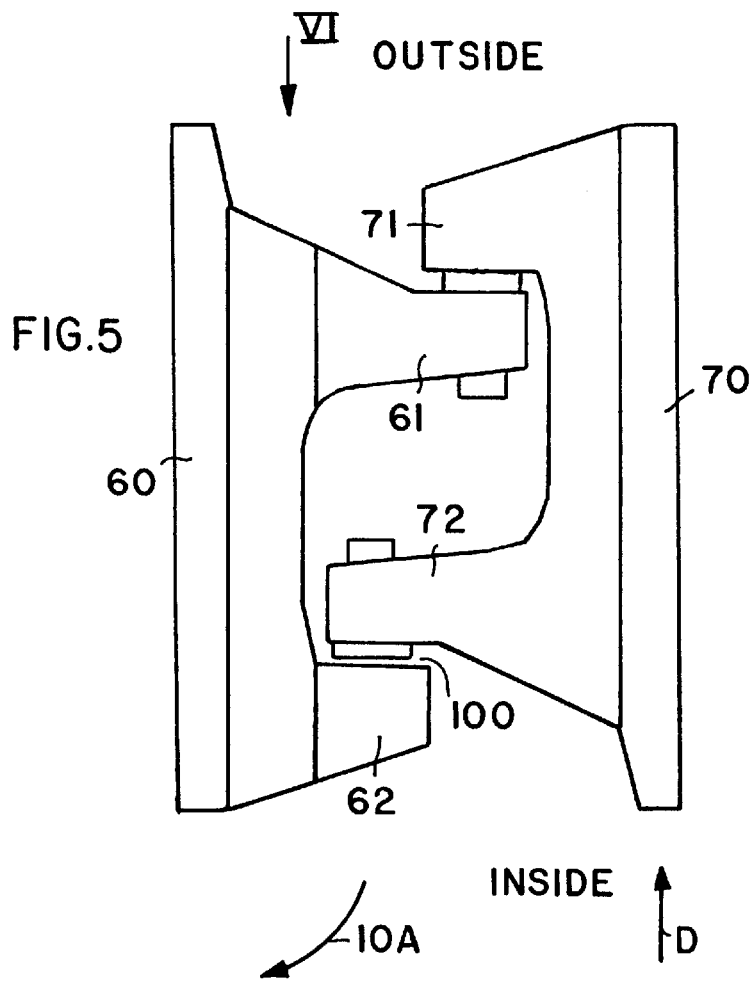
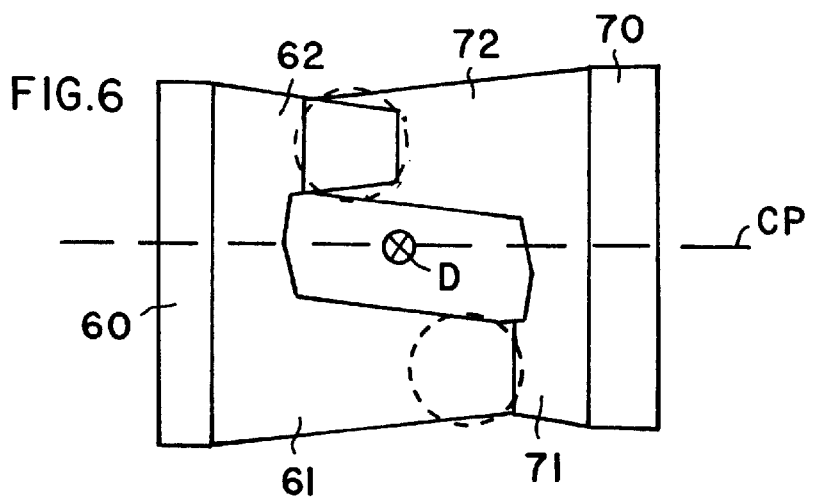

AIRCRAFT DOOR STRUCTURE

PRIORITY CLAIM

This application is based on and claims the priority under 35 U.S.C. §119 of German Patent Application 199 23 441.8, filed on May 21, 1999, the entire disclosure of which is incorporated herein by reference.

FIELD OF THE INVENTION

The invention relates to an aircraft door structure with a door and a frame. The door has at least several load bearing beams spaced apart from each other and sandwiched between inner and outer door skins or claddings. Each beam end carries a stop member. When the door is closed the stop member bears against a stop element secured to the door frame surrounding a door opening in the aircraft body.

BACKGROUND INFORMATION

The pressure difference which arises in flight, between the passenger cabin and the outer atmosphere, results in pressure loads which need to be taken up by the door structure and transferred to the door frame which transmits these forces to the aircraft's fuselage structure. The pressure loads applied at the door act in the direction of the pressure gradient, i.e. from the passenger cabin essentially in the direction to the outside of the fuselage. In order to take up these pressure loads the door structure comprises several load bearing beams spaced apart in different horizontal planes generally in the direction of the door width. These beams are connected to and sandwiched between the outside and inside skin or cladding of the door, thus providing rigidity to the door in the load direction of the applied pressure load.

U.S. Pat. No. 4,720,065 (Hamatami) discloses an outwardly or inwardly opening so-called plug-type aircraft door. A complicated latching and unlatching mechanism is required to operate the door. The conventional door of U.S. Pat. No. 4,720,065 also comprises elements for transferring the pressure loads to the frame and thus to the fuselage structure. For this purpose, each end of the load bearing beams has a stop member for cooperation with a corresponding stop element on the frame. Thus, the stop members at the level of the beam ends and the respective stop elements of the frame are provided in pairs. Normally a door comprises about six to eight stop members, depending on the number of beams cooperating with six to eight stop elements on the door frame.

When the door is closed, the stop members of the door bear against the stop elements of the frame in the direction of the pressure load. Thus each beam of the door is supported against the direction of the pressure load. If one or several of these stop members and elements break, a load redistribution occurs from the now unsupported beam end of the door to the stop members and elements still transferring load, whereby additional shearing and torsional loads act on the door structure. Such added loads can deform the door structure giving rise to the danger that the door's pressure-sealing characteristics are diminished. Moreover, during flight the stop members and elements are subjected to dynamic loads, whereby not immediately noticeable cracks may occur in the stop members and/or in the stop elements or even failure of the stop members and/or elements may occur.

German Patent Publication DE-OS 2,907,550 (Bergman et al.) discloses a foldable insert door for an aircraft. The door and frame are provided with paired stop elements as shown in FIG. 1 of the present disclosure. The safety of such conventional doors leaves room for improvement, particularly with regard to the reliability of the seal in case one or more of the door stop pairs should fail.

German Patent Publication DE-OS 197 30 918 (Langlet) describes a locking mechanism for doors particularly aircraft doors. Mechanically or pneumatically or hydraulically driven spacer members are provided between the door and the door frame to assure a uniform load distribution around the door under all operating conditions whereby the door seals are protected.

OBJECTS OF THE INVENTION

In view of the foregoing it is the aim of the invention to achieve the following objects singly or in combination:

to avoid door stop failures in an aircraft door by improving the safety of the stops that support a closed door relative to the aircraft fuselage or body;

to reduce the weight of the door structure by providing redundant door stop features so that standard load conditions can be taken into account for determining door strength rather than maximum load conditions;

to reduce the need for conventionally required door stiffening features by providing redundant door stop features which have a door stiffening effect; and to reduce production costs by providing door strength where needed and avoiding unnecessary reinforcements.

SUMMARY OF THE INVENTION

According to the invention the door and door frame construction for an aircraft comprises at least two pairs of load transmitting bearing surfaces arranged one behind the other in the load direction so that under normal operating conditions only one pair of the two pairs of bearing surfaces bears the load and the second or redundant pair becomes immediately effective in case of failure of an existing load transmission through the one pair of bearing surfaces. This second, immediately available load transmission transfers pressure loads from the door structure to the frame structure as a replacement of the normally effective load transmission, so that decompression is avoided. This second load transmission is made possible without large expenditure. Each pair of bearing surfaces comprises one bearing surface as part of the door structure and one bearing surface as part of the frame structure. A plurality of such double bearing surface pairs are preferably distributed around the door.

The term "arranged one behind the other" as used herein is intended to cover the in line arrangement of two pairs of load transmission surfaces and an arrangement in which the second pair is laterally displaced relative to the first pair and relative to the load direction just sufficient for the door to be opened without lifting.

According to one embodiment of the invention, one door stop bracket carries at least two bearing surfaces arranged one behind the other in the load direction. Similarly, one frame stop bracket carries at least two bearing surfaces also arranged one behind the other in the load direction. Preferably, each stop bracket comprises at least two bracket arms which provide the bearing surfaces.

According to another embodiment each bearing surface is part of its own separate door stop bracket or its own separate frame stop bracket. These separate brackets are individually secured to the door or to the frame respectively or may be integral parts of the respective door or frame. This feature of making the brackets integral parts of the door or frame applies to any brackets forming one or more bearing surfaces.

The invention makes it possible to increase safety with little effort and expense. Based on the invention, only the standard load conditions must be taken into account when calculating the strength and dimensions of the door. The heretofore additionally necessary door stiffeners no longer need to be part of the construction criteria for the door structure, whereby a significant weight reduction is achieved even if the stop brackets are heavier because the remaining door structure is lighter than heretofore, which also saves costs.

BRIEF DESCRIPTION OF THE DRAWINGS

In order that the invention may be clearly understood, it will now be described in connection with example embodiments, with reference to the accompanying drawings, wherein:

FIG. 2 shows a horizontal cross-section through a closed door with a pair of redundant door stop bearing surfaces according to the invention;

FIG. 3 shows schematically a lateral displacement of the stop members and stop elements to permit opening the door;

FIG. 4 shows schematically a spacing of sufficient length between the respective stop member and stop element to permit opening the door;

FIG. 5 shows a door bracket and a frame bracket with the respective stop members and stop elements laterally displaced in two directions to permit opening the doors; and FIG. 6 is a view in the direction of the arrow VI in FIG. 5.

Figure 1:
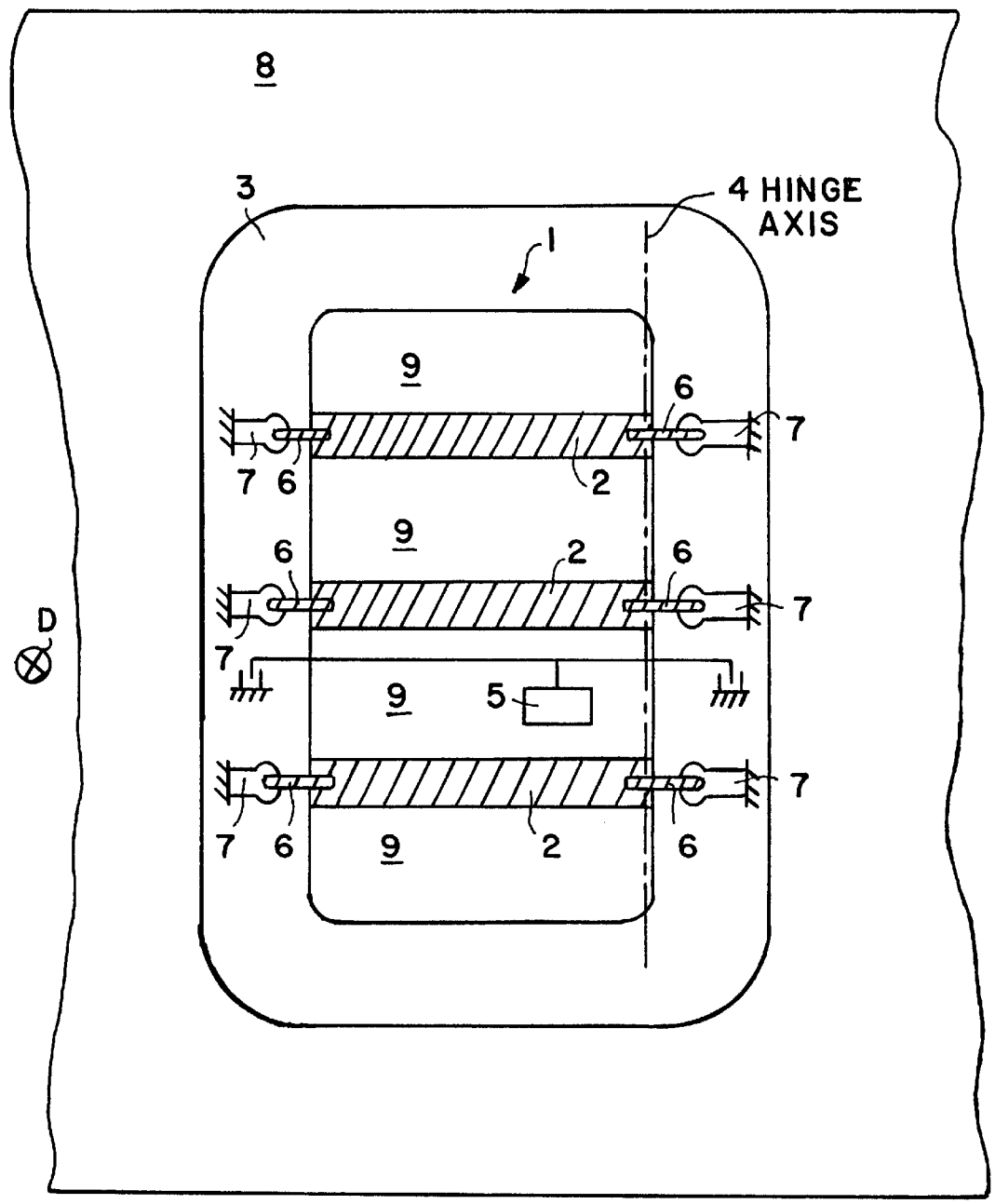
FIG. 1 is a plan view, partly in section, of a closed conventional door in the fuselage of an aircraft, whereby the view direction corresponds to the load direction from the inside to the outside of the aircraft.

DETAILED DESCRIPTION OF PREFERRED EXAMPLE EMBODIMENTS AND OF THE BEST MODE OF THE INVENTION

FIG. 1 shows a conventional aircraft door 1 installed in a door opening surrounded by a frame 3 in an aircraft body wall 8. The door 1 comprises a plurality of load bearing beams 2 positioned in several different, usually horizontal, planes and spaced apart from each other. The beams may be arranged in any plane including horizontal planes. The invention does not depend on the orientation of the beams 2. As shown the door 1 is closed and seen from the interior of the fuselage. Such a door can be used in fixed-wing aircraft, rotary-wing aircraft or in transport capsules of a balloon and in any pressurized container.

The length of the shown load bearing beams 2 is the same as the width of the door 1. The beams 2 are connected to the skin or cladding 9 of the door. Each individual beam 2 comprises at each beam end a single stop member 6 with a bearing surface facing outwardly in the load direction D shown as a cross in a circle. When the door 1 is in its shown closed position, the bearing surface of the stop member 6 on the door bears against a respective bearing surface of a stop element 7 attached to the door frame 3. The respective bearing surfaces are arranged and positioned for positively touching each other in the load direction D for a proper load distribution from the door 1 through the frame 3 into the body wall 8.

Furthermore, the door 1 comprises a locking and unlocking mechanism 5 with a rod assembly and control unit. The door 1 also comprises a hinging axis 4. In flight there is a pressure difference inside the aircraft body relative to the outside thereof so that the pressure load on the door 1 is in the direction D toward the plane of the drawing sheet of FIG. 1.

The stop members 6 on the door 1 or rather on the ends of the beams 2 of the door 1 and the stop elements 7 on the frame 3 are arranged in pairs in a horizontal plane defined by the position of the respective beam 2. The beams 2 of the door 1 rest with their stop members 6 on the stop elements 7 of the frame to take up and distribute the pressure load uniformly under normal operating conditions, whereby the pressure loads are safely transferred from the door 1 to the frame 3. Failure of one or several stop members 6 and/or stop elements 7 can lead to localized higher stress points and even to considerable deformations of the conventional door 1, since a load redistribution takes place when one or more stop members 6 and/or one or more stop elements fail. In the worst case such deformations can result in decompression because the door no longer provides the required pressure seal. FIG. 2 illustrates an embodiment of the invention in a sectional view with the section plane extending horizontally through a door 10 just above a bearing beam 2A having a mounting beam end 2A' and through a frame portion 30. Only two pairs of load bearing surfaces 600, 700 and 601, 701 are shown. The number of these pairs of bearing surfaces will depend on the size of the door, particularly the number of bearing beams 2A in the door. Only the left-hand end of the beam 2A is shown. A single door stop bracket 60 having twin bracket arms 61 and 62 is secured, for example, by screw connections 60A to the beam end 2A'. However, it is possible to construct the stop bracket 60 with its bracket arms 60 and 61 as an integral part of the beam end 2A'. Another modification provides separate mounting brackets for each bearing surface. In that case the bracket 60 will be divided into two separate brackets. In all embodiments two stop members 61, 62 will be provided preferably arranged in line or one behind the other in the direction of the pressure load D. The "one behind the other" arrangement includes a lateral displacement of the second stop member 62 relative to the first stop member 61. Each stop member 61, 62 comprises or forms one of the above mentioned bearing surfaces 600 or 601. When the locking state in the closed position of the door 10 is reached, the bearing surfaces 600 and 601 interact with corresponding load bearing surfaces 700, 701 of the frame portion 30 as follows.

A frame stop bracket 70 is secured to the frame 30 by screws 70A, for example. The frame stop bracket 70 has two bracket arms 71, 72 forming stop elements which are also aligned one behind the other relative to each other in the direction D of the pressure load. The above mentioned bearing surfaces 700, 701 are formed by the stop elements 71, 72 and presented in positions that are opposite to the corresponding bearing surfaces 600 or 601 to form two pairs of bearing surfaces 600, 700 and 601, 701. In the shown closed position of the door and under normal operating conditions the bearing surface 600 of the door stop member 61 interacts with the bearing surface 700 of the frame stop element 70, whereby the bearing surfaces 600 and 700 positively rest against each other. In this way, the load transfer from the door 10 through the frame 30 to the fuselage or body wall 8 is assured under normal operating conditions without any load transfer through the pair of bearing surfaces 601 and 701.

According to the invention a small gap 100 is formed between the bearing surface 601 and the bearing surface 701, so that these surfaces 601, 701 forming the second or redundant pair do not contact each other under normal operating conditions. Only in case of failure of one of the stop member 61 and/or the stop element 71 does the gap 100 disappear, whereby the bearing surfaces 701 and 601 come to rest against each other for a redundant load transfer. The gap 100 provides a reserve position for the stop member 62 and the stop element 72. The advantage of the gap 100 is particularly seen in that a considerable adjustment effort for positioning the bearing surfaces 601, 701 in relation to the bearing surfaces 600, 700, which are already resting against each other, is avoided. Thereby, highly precise tolerances are not necessary for the purpose of the invention.

The redundant bearing surfaces 601 and 701 of the invention spring into action immediately when an existing load transmission through the bearing surfaces 600, 700 fails. The load transfer through the surfaces 601 and 701 also takes place at the same end 2A' of the bearing beam 2A as the load transfer through surfaces 600, 700, whereby no additional bearing beams are required for the redundant feature. Thus, this redundant feature increases the safety with little technical effort and expense. In this way, total failure of the stop mechanism involving the danger of deformation of the door with consequential loss of sealing characteristics, becomes unlikely. As a result a total failure of the door no longer needs to be taken into account when constructing the present door. Hence, only the standard load conditions for the door need to be taken into account when calculating the required door strength.

The above mentioned adverse load distributions in a conventional door shown in FIG. 1 due to failure of the stops has been avoided by the door of the invention shown in FIG. 2 so that the extra conventional stiffening of the doors is not required according to the invention. This is an advantage of the invention because it leads to a significant weight reduction in spite of heavier door stop brackets 60 and frame stop brackets 70. Fewer load bearing beams 2A are needed and the inner cladding or skin 9B could be avoided or replaced by a thin inside skin that does not bear any load, whereby substantial cost savings are achieved. The outside skin 9A will still be connected to the beams 2A.

The invention is applicable to doors for fixed-wing aircraft, rotary-wing aircraft or transport containers of flying balloons or any pressurized container.

There are several possibilities for avoiding that the bracket arm 72 or 72A of the frame stop bracket 70 interferes with an opening motion of the door 10 in the direction shown by an arrow 10A.

FIG. 3 shows that the bracket arm 72A is shorter than the bracket arm 71 so that arm 72A is laterally displaced, so to speak, in the plane of the drawing sheet to thereby avoid contact between arm 61 and arm 72A when the door is opened in the direction 10A.

As shown in FIG. 4, if the stop components are aligned one behind the other, a spacing S between the bracket arm 61 of the door stop bracket 60 and the redundant bracket arm 72 of the frame stop bracket 70 in the load direction D must be sufficient to permit the bracket arm 61 to freely pass the bracket arm 72 when the door 10 is opened in the direction 10A. FIG. 4 also shows that each of the bracket arms has its own individual bracket separate from the other brackets.

FIGS. 5 and 6 show another embodiment wherein the redundant stop components 62, 72 are displaced relative to the main stop components 61, 70 in two directions. First, the redundant stop components 62, 72, namely the bracket arms 62, 72 are displaced behind a central horizontal plane CP through the door while the stop components 61, 71 are displaced in front of the plane CP. Second, these stop components are also displaced in parallel to the central plane in opposite directions away from the load direction. Thus, lateral displacement may be achieved in the plane of the drawing sheet as shown in FIG. 3 or in a direction perpendicularly to this plane. This lateral displacement merely needs to accommodate the width of the stop components in the load direction D.

In still another embodiment the redundant stop components may be closely spaced from the main stop components. In such a construction the door can be slightly lifted manually prior to opening by a tilting motion in the direction of the arrow 10A, whereby the arm 61 can freely pass the arm 72.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A door structure comprising a door (10) and a frame (30) surrounding said door when said door is closed, said door comprising a number of load bearing beams (2A) each having two beam ends (2A') at least one first stop bracket (60) projecting laterally out of said door at each beam end (2A'), each stop bracket (60) comprising at least first and second stop members (61, 62) each forming a respective first stop surface (600, 601) facing in a load direction (D), said frame comprising at least one second stop bracket (70) for each of said at least one first stop bracket, each said second stop bracket (70) comprising at least first and second stop elements (71, 72), each stop element forming a respective second stop surface (700, 701) facing inwardly for cooperation with a respective first stop surface (600, 601) to hold said door in said frame, wherein said at least two stop members (61, 62) comprise at least one active stop member (61) and at least one redundant stop member (62), wherein said at least first and second stop elements (71, 72) comprise at least one active stop element (71) and at least one redundant stop element (72), whereby under normal operating conditions said active stop member (61) cooperates with said active stop element (71) in holding said door in said frame, and wherein said redundant stop member (62) engages said redundant stop element (72) when said active stop member (61) or said active stop element fails.

2. The door structure of claim 1, wherein said first stop surfaces (600, 601) and said second stop surfaces (700, 701) are arranged one behind the other relative to said load direction (D).

3. The door structure of claim 1, wherein said first stop surfaces (600, 601) and said second stop surfaces (700, 701) are axially aligned relative to one another in said load direction (D).

4. The door structure of claim 1, further comprising a spacing (S) between said first stop member (61) and said second stop element (72), said spacing (S) having a length in said load direction (D) sufficient to permit opening said door in a tilting direction (10A).

5. The door structure of claim 1, wherein said door is liftable in a direction perpendicularly to said load direction to permit opening said door.

6. The door structure of claim 1, wherein said first stop member (61) and said first stop element (71) form a first pair of load bearing surfaces (600, 700) which bear against each other when said door is closed under normal operating conditions, and wherein said second stop member (62) and said second stop element (72) form a second pair of load bearing surfaces, which enclose a gap (100) between said stop surfaces (601, 701) under said normal operating conditions, and wherein said gap (100) disappears when said first stop member (61) or said first stop element (71) fails.

7. The door structure of claim 1, wherein each first stop bracket is separately mounted to said beam end (2A'), and wherein each second stop bracket is separately mounted to said frame (30) so that a stop member and a stop element are aligned with each other in said load direction (D).

8. The door structure of claim 1, wherein said first stop brackets are mounted in pairs to said beam end (2A') and wherein said second stop brackets are mounted in pairs to said frame structure (30), whereby a stop member and a stop element are aligned with each other in said load direction (D).

9. The door structure of claim 1, wherein said stop members are integral parts of said door and wherein said stop elements are integral parts of said frame.

10. The door structure of claim 1, wherein said first stop bracket comprises at least two separate sections secured to said door, and wherein said second stop bracket comprises at least two separate sections secured to said frame.

11. The door structure of claim 1, wherein said second stop member (62) and said second stop element (72) are laterally displaced relative to said first stop member (61) and said first stop element (71) for permitting opening said door in a hinging direction (10A).

12. The door structure of claim 1, wherein said second stop member (62) and said second stop element (72) are laterally displaced in two directions relative to a central plane (CP) and relative to said load direction (D).

* * * * *